US010491582B1

(12) United States Patent
Rule et al.

(10) Patent No.: US 10,491,582 B1
(45) Date of Patent: Nov. 26, 2019

(54) MESSAGE AUTHENTICATED COMMUNICATION SESSIONS

(71) Applicant: Capital One Services, LLC, McLean, VA (US)

(72) Inventors: Jeffrey Rule, Chevy Chase, MD (US);
Gaurang Bhatt, Herndon, VA (US);
Lukiih Cuan, Washington, DC (US);
Rocky Guo, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/516,641

(22) Filed: Jul. 19, 2019

(51) Int. Cl.
| H04L 29/08 | (2006.01) |
| H04L 29/06 | (2006.01) |
| H04L 12/58 | (2006.01) |
| G06N 20/00 | (2019.01) |
| H04L 9/08 | (2006.01) |
| G06F 17/28 | (2006.01) |

(52) U.S. Cl.
CPC .............. *H04L 63/08* (2013.01); *G06F 17/28* (2013.01); *G06N 20/00* (2019.01); *H04L 9/0825* (2013.01); *H04L 51/04* (2013.01); *H04L 63/0442* (2013.01); *H04L 67/141* (2013.01)

(58) Field of Classification Search
CPC .......................... H04L 67/141; H04L 65/1069

USPC ......................................................... 713/170
See application file for complete search history.

(56) References Cited

U.S. PATENT DOCUMENTS

| 8,204,932 | B2* | 6/2012 | Garcia-Martin | ........ H04L 51/04 370/465 |
| 9,479,469 | B2* | 10/2016 | Kabbes | ................. G06F 16/273 |
| 9,866,511 | B2* | 1/2018 | Abou Mahmoud | .... H04L 51/30 |
| 2009/0216836 | A1* | 8/2009 | Haynes | ................. G06Q 10/107 709/204 |
| 2016/0182412 | A1* | 6/2016 | Kabbes | ................. G06F 16/273 |
| 2016/0366088 | A1* | 12/2016 | Abou Mahmoud | .... H04L 51/30 |

* cited by examiner

*Primary Examiner* — Teshome Hailu
(74) *Attorney, Agent, or Firm* — Banner & Witcoff, Ltd.

(57) ABSTRACT

Aspects described herein may allow for the generation of a message to be sent to an intended recipient of a request for a communication session prior the initiation of the communication session. The system may monitor applications and associated devices to determine the initiation of the communication session. Based on such a determination, the system may generate a message to be presented to a communication initiating user and to be sent to an intended recipient of the communication session. The system may determine data for the message based on an analysis of the data associated with the communication initiating user, and the system may apply a machine learning model to generate draft messages for the user. Messages may be generated to authenticate a user with an intended recipient of the communication session.

20 Claims, 5 Drawing Sheets

US 10,491,582 B1

MESSAGE AUTHENTICATED COMMUNICATION SESSIONS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to generation of messages prior the initiation of the communication session. More specifically, aspects of the disclosure may generate a draft message to be presented to a communication initiating user and to be sent to an intended recipient of the communication session, based on an analysis of data associated with the communication initiating user.

BACKGROUND

Calls associated with telemarketers have long been a source of unwanted phone calls. Phone calls and other communications sessions are being initiated by an increasing number of unwanted and malicious sources. Receivers of those communications are responding to the increase in unwanted calls by avoiding answering communications when they are unsure of the identity of the caller.

In addition, an increasing number of calls and other communications initiated by a computer or robocalls are being received by from spoofed phone numbers. The spoofed phone numbers may appear to a receiver of a communication from a local area associated with the receiver but, in fact, the communication is from remote telemarketers located in an arbitrary location. In view of the large number of such calls, the receivers of phone calls are increasingly likely to screen calls from even local numbers which are not immediately recognized or numbers which are not previously stored on the device of the receiver. For example, mobile phone users may screen any calls which are not recognized as being associated with a stored contact. Based on increased call screening, connecting with desired recipient is increasingly difficult.

Communication systems are also subject to an increasing amount of data being accessible from anywhere at any time, including illegally obtained information. Telemarketers and scammers are able to access a wide variety of information about their intended targets. Recipients may be unaware of the source of the information, and may be more likely to be open giving a live operator angles for personal and financial information. As the identity of the origin of the communication is not authenticated, the receiver of the call may be susceptible to a variety of scams.

Aspects described herein may address these and other problems, and generally improve communications systems by offering an improved method of authenticating and identifying callers.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may provide for the generation, by a computing or communication device, of a draft message to be transmitted to an intended recipient and based on an indication of the initiation of a communication session with the intended recipient. The communication session may be one of a phone call, a voice over IP communication session, or a video communication session. When the system determines that a communication session is being initiated or may be initiated in the near future, the system may generate a draft message to be transmitted to the intended recipient, display the generated draft message to a call initiating user, receive user input to alter or approve the draft message and transmit a message to the intended recipient. The message may alert the intended recipient that the communication session, such as a phone call or video session, will soon be transmitted to a device of the intended recipient, and may indicate context information regarding the communication session such that the intended recipient may become aware of the source of the communication.

The context information for a draft message may include a name, a job title, identification of the source of the communication such as a phone number, and information regarding the subject of the communication. The system may gather data for a draft message to be presented to a user from information stored by various communications applications associated with the user. The system may include a machine learning module which may process data from a plurality of sources for information relevant to the communication session. For example, the system may gather data from a calendar appointment, from an email, or from other data sources, which the user has granted the system access.

Further aspects described herein may provide for authenticating a device of the user to a device of the intended recipient. The system may identify one of a plurality of messaging applications to be used to generate and transmit message data, and that determination may be based on a database of information accessible by members of a group associated with both the user and the intended recipient. The system may also may send an authenticator, such as a public key, to an intended recipient to authenticate a communication, and may encrypt message data to be sent to a user.

Corresponding methods, apparatus, systems, and computer-readable media are also within the scope of the disclosure. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for generating messages to be sent to an intended recipient of a communication session in advance of the communication session. As discussed further herein, a combination of features may allow for automatically generating messages based on information determined from data and applications associated with the user and an intended recipient.

Before discussing these concepts in greater detail, however, several examples of a computing device that may be used in implementing and/or otherwise providing various aspects of the disclosure will first be discussed with respect to FIG. 1.

Figure 1:
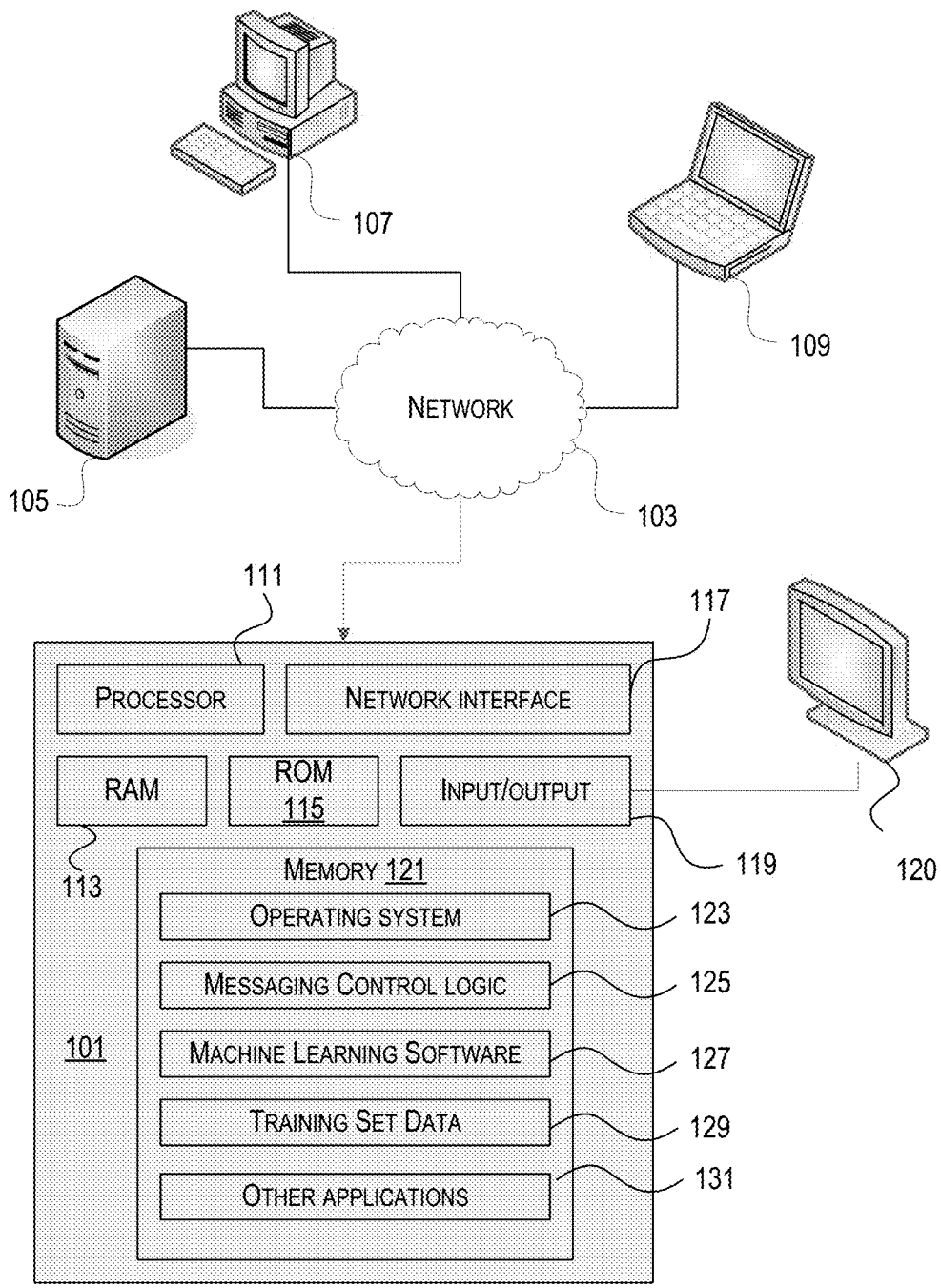
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), a personal assistant computing device (e g Amazon Alexa or Google Home), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, a message generation application or control logic 125 for instructing computing device 101 to perform aspects discussed herein, machine learning software 127, training set data 129, and other applications 131. The machine learning software 127 may be incorporated in and may be a part of message generation application 125. The machine learning software 127 and training set data 129 may also be provided as a web service, or may be stored in a networked computer that provides feedback data and updates to the message generation application 125. The other applications 131 may be interfaced by the message generation application 125. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
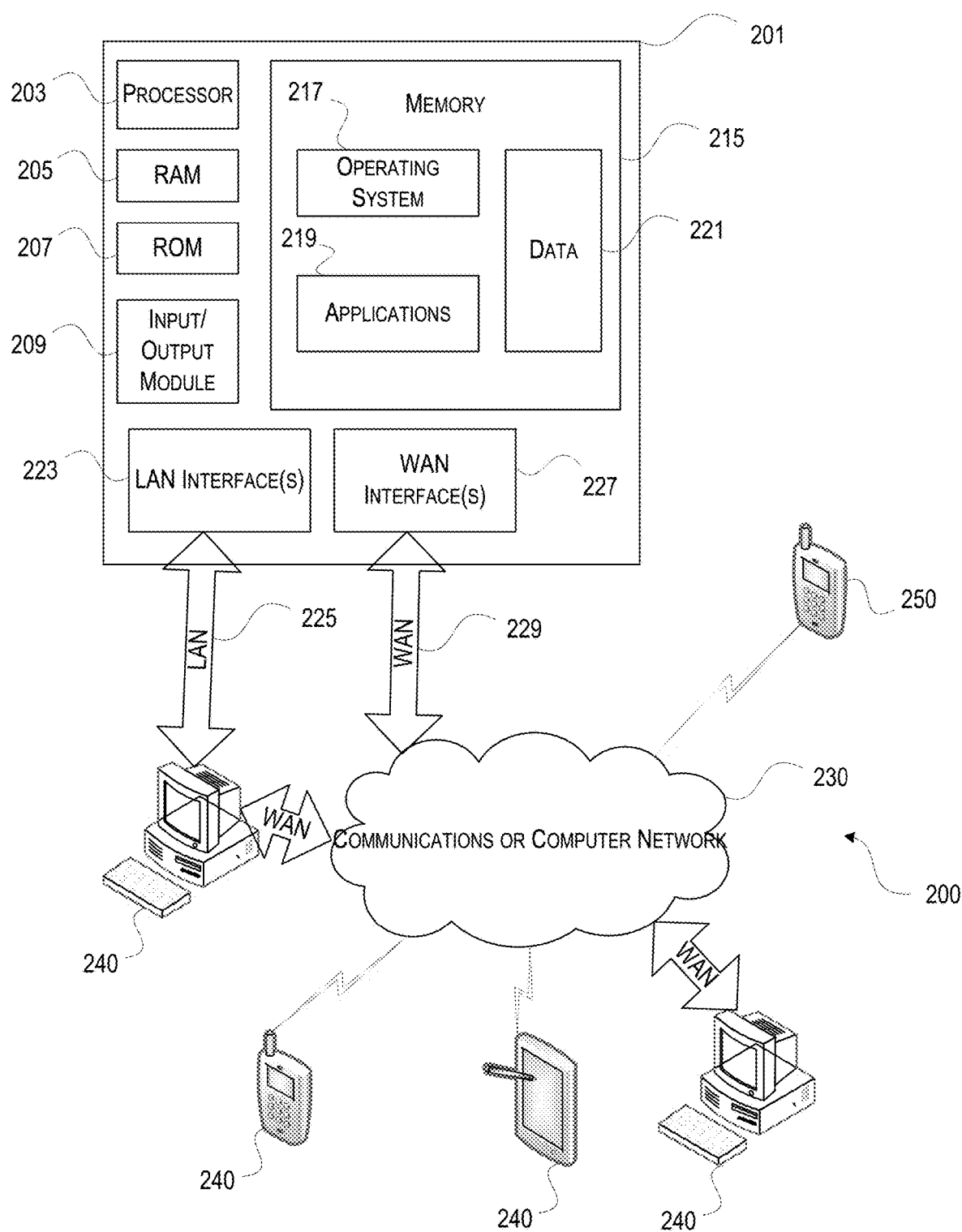
FIG. 2 depicts an illustrative system architecture that may be used in accordance with one or more illustrative aspects described herein.

With further reference to FIG. 2, one or more aspects described herein may be implemented in a networked application environment. FIG. 2 depicts an example system architecture including a computing device 201 in an illustrative computing environment 200 that may be used according to one or more illustrative aspects described herein. Computing device 201 may be used as a server in a single-server or multi-server system (e.g., a remote access or cloud system) configured to provide network application processing for client devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions, such a language processing functions or processing for a machine learning algorithm for message generation, as described herein. For example, memory 215 may store software used by the computing device 201, such as an operating system 217, application programs 219, and an associated database 221.

Computing device 201 may operate in a networked environment supporting connections to one or more remote computers, such as communication devices 240 (also referred to as terminals or client devices). The communication devices 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as communications or computer network(s) 230. The communications or computer network(s) 230 may include a plurality of communications networks which may be accessed by the computing devices to establish communications between a user and intended communications recipient (e.g., a cellular network, the Internet, a Plain old telephone service (POTS), etc.). It will be appreciated that the network connections shown are illustrative and other means of establishing a communications link between the devices may be used. Computing device 201 and/or communication devices 240 may also be mobile terminals (e.g., mobile phones, smartphones, personal digital assistants (PDAs), notebooks, etc.), Voice over Internet Protocol (VoIP) phone devices or terminals, or home computing devices which may be operating as a virtual assistant devices (e.g. Alexa), including various other components, such as a battery, speaker, display screens, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more communication devices 240 may be in communication with one or more computing device(s) 201. In one embodiment, the computing environment 200 may include a network appliances installed between the computing device(s) 201 and communication device(s) 240. The network appliance may manage client/server connections and authenticators, and in some cases may provide processing services for a communication device(s) 240.

The communication device(s) 240 may be referred to as a single communication device or a single group of communication device(s) 240, while computing device(s) 201 may be referred to as a single computing devices 201 or a single group of computing device(s) 201. In one embodiment a single communication device 240 communicates with more than one computing device 201, while in another embodiment a single computing device 201 may communicate with more than one communication devices 240. In yet another embodiment, a single communication device 240 may communicate with a single computing device 201.

In addition, one or more receiving communication device(s) 250 may be in communication with one or more communication device(s) 240. Based on a type of communication initiated by a user of one or more communication device(s) 240, one or more intended recipient communication device(s) 250 may receive one or more types of communications via the communication or computer networks 230.

Communication devices 240 and 250 may be referenced by any one of the following non-exhaustive terms: communication device(s); mobile device(s); client machine(s); client(s); client computer(s); client device(s); client computing device(s); local machine; remote machine; client node(s); endpoint(s); or endpoint node(s). The computing device 201 may be referenced by any one of the following non-exhaustive terms: server(s), local machine; remote machine; network processor(s), or host computing device(s).

A communication device 240 may display application output generated by an application, which may be remotely executing on or receive data from a computing device 201, and the communication device 240 may execute a communication program or application to display the output in an application window, a browser, or other output window. For example, the application is a phone application, a video communication application, a calendar application, or a messaging application such as an SMS messaging application. A messaging application may be determined based on addressing information associated with the intended recipient. Applications, as used herein, are programs that may execute after an instance of an operating system (and, optionally, also a desktop) has been loaded.

Computing device 201 may be a first computing device 201a (not shown) that may receive requests from a communication device 240, may forward the request or generate another request based on the received request to be transmitted to a second computing device 201b (not shown), and responds to the request generated by the communication device 240 with a response from the second computing device 201b (not shown). First computing device 201a may acquire an enumeration of applications available to or accessible by the client machine 240. First computing device 201a may then present a response to the client's request using a web or other network interface, and communicate directly with the communication device 240 to provide the communication device 240 with access to an identified application. One or more communication devices 240 and/or one or more servers 206 may transmit data over network 230, e.g., network 103 or 230.

The requests received by computing device may be request for determining data for a draft message. In some example, the communication device 240 may request data for generating a draft message, which may include data for a plurality of users stored in a network data store or database 221. The communication device 240 may request network data processing that takes advantage of larger network processing power of the processor 203 of a network or cloud computing device 201. The applications 219 may include a network or cloud based version of machine learning software 127, and the data 221 may store a larger set of training set data 129, and other applications such as natural language processing applications for analyzing new data or for processing data of a group or cluster of users.

A trained machine learning model may be provided with input beyond the training set and used to generate predictions regarding the likely results. Applications or artificial neural networks may be provided within a computing device 201, which may have many applications, including image recognition, object classification, speech recognition, natural language processing, text recognition, behavior modeling, and others. A machine learning model may include a message generation architecture may be built for the purpose of providing clear identification of a communication initiating user (e.g. a caller) to an intended recipient. Such a model may be built to recognize patterns in messaging communication behavior of one or more users. Alternatively and/or in addition, such a model may be built to recognize special user cases or abnormal behavior of one or more users accessing the database.

In a model provided for an organization, such as a business, multiple users may be grouped referred to as clusters of users. Such a cluster of users may have similar roles in an organization and may have a related style for messaging. Alternatively and/or concurrently, such a cluster of users may have similar behavior patterns or a similar level of recognition by intended recipients when initiating communications. For example, a group of information technology (IT) employees may contact other groups of employees as intended recipients with whom they have not previously had communications. In such cases, the intended recipients may not recognize the identification information associated with an IT employee (e.g. a name or telephone number) and may ignore the communication or allow a call to go to voicemail. For example, a cluster of IT employee users may be set as part of building the model where the cluster of users are identified with certain information determined to be useful in identifying any member of an IT employee cluster to an intended recipient. As such, a model that may include an artificial neural network architecture may be built to recognize known patterns of identifying one or more users, including clusters of users.

Computing device 201 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Having described some example operating environments and example of computing devices which may be used to implement some aspects as discussed further below, discussion will now turn to example methods and systems for sending pre-communication messages that may announce or authenticate a communication session.

Figure 3:
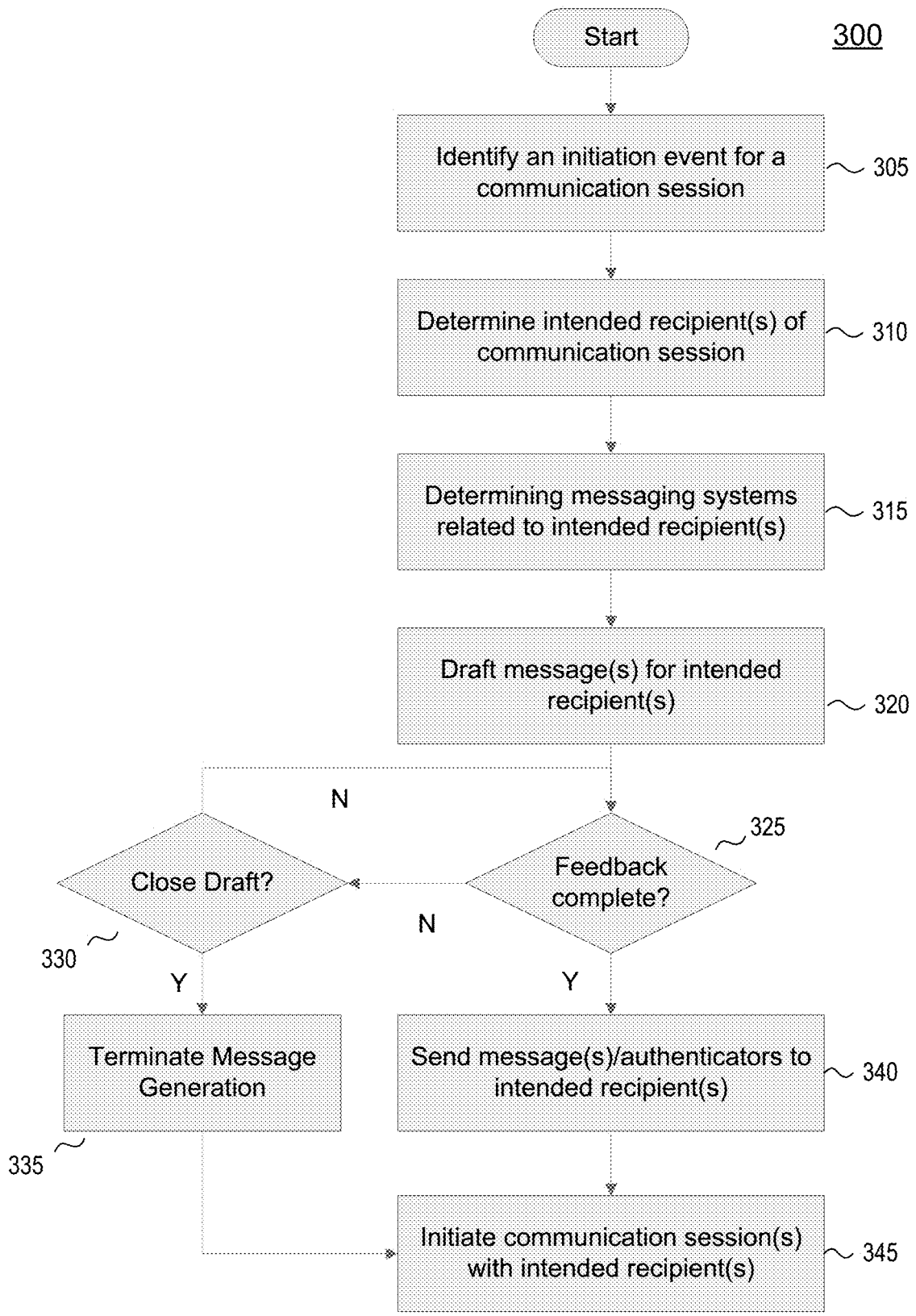
FIG. 3 depicts a flow chart for a method of generating an introductory message according to one or more aspects of the disclosure.

FIG. 3 illustrates an example method 300 for method of generating an introductory message to be transmitted to an intended recipient by a device such as a computing device 101, computing device 201, or a communication device 240, in accordance with one or more aspects described herein. The following discussion will refer to an exemplary communication device for implementing the method, though the use of a communication device such as a mobile phone is exemplary and not limiting.

In step 305, a communication device may be used by a user, and a generation system may identify an initiation event for a communication session. For example, when using a smart phone, the initiation event for a communication session may be identified from a plurality of applications. The communication device may identify an initiation event for one of a phone call, a voice over IP communication session, a video communication session, or other communication session which may combine one or more of messaging, chatting or calling features (e.g. Google Hangouts), and the initiation event may be associated with a dialing of telephone number or entering of other contact data, a selection of a hyperlink for type of communication in a document or application, a notification that a meeting or event is about to begin, opening a file or contact file in a sales system, the initiation of a conferencing system, or the like. Text data of an event reminder or notification may be analyzed by the communication device to determine at least one of a phone number, a conferencing service identifier, or a video service identifier within the text data. A number from a VoIP call or communication session may have a message generation option presented with the contact information on a web interface for initiation of the VoIP call or communication session. The initiation of a communication session may be anticipated based on, for example, calendar appointment data including time data and contact or application information for a communication session. A draft message may be determined to be generated based on notification for an anticipated communication session, such as a calendar reminder.

In step 310, the communication device may determine intended recipient of the communication session. The intended recipient may be determined based on a phone number dialed, data obtained based on a link selected, data associated with a button pressed on a communication application, participants determined from a meeting invite, or the like.

In step 315, the communication device may access stored contact data in a phone, or may separately access a database of contact information that may include data indicating each messaging application associated with an intended recipient. An organization may have an organizational contact database of messaging contact information associated with each member of the organization. For example, based on the initiation of a VoIP call or video session, the system may determine a cell phone number so that a SMS text message may be sent to a personal cell phone of the intended recipient, or the system may determine a that the cell phone number is associated with another messaging service, such as WhatsApp. The user may be presented the option of selecting a preferred messaging service based on a plurality of messaging services which are determined to be associated with an intended recipient.

In step 320, a draft message may be generated for intended recipient, and may introduce or verify the identity of the user to the intended recipient. The communication device may include a message generation application that may utilize integrated, associated or network based image recognition, object classification, speech recognition, natural language processing, text recognition, regression analysis, behavior modeling, and others data processing. In addition, a machine learning model, which may be organization or user specific, may be used to determine data for the draft message based on previous message data. The previous message data may be based on training data. The message generation application may be configured with a predefined draft message format, or may be configured with a user customized draft message format. Messages may include a plurality fields of data that may be filled based on data associated with a contact information of the user initiating the communication session. For example, the message may be a format such as "GREETING, you will shortly receive a COMMUNICATION from NAME, TITLE at ORGANIZATION, to discuss EVENT/CONTEXT", where each element set forth in all capital letters may be a field to be replaced with data specific to the user and the communication session. The contact information may include a name, a job title, links to a user web page, and organizations or groups associated with the user. The message may also include a mobile device identifier, a user identifier associated with the mobile device, and other data for verifying the identity of the user or device initiating the communication session. A reason for an anticipated or initiated communication session may be determined based on the information related to the time of the communication session, such as associated events in calendar data, or data related to an intended recipient of the communication session, such as email data associated with the intended recipient.

The data may also be customized for an intended recipient, based on data associated with an intended recipient. Such data may be determined based on data associated with the intended recipient, which may be stored in network database associated with at least one of the user and the intended recipient. When both the user and the intended recipient have downloaded a common application used for generating introductory messages, stored data specific to the intended recipient may be used to generate a message to the intended recipient.

In step 325, the communication device may provide draft message to user, and may request feedback regarding the draft user introduction message to be sent to the intended recipient. The draft message may be displayed for the user, and may include possible alternative language or suggested topics for inclusion based on data determined for possible inclusion during the step 320. The feedback may include a selection of an application for transmitting a message to the intended recipient, selection of a style of message, editing of the message data, and/or the addition of new information, which may include or attach documents to be attached, based on feedback from a user, which may be received via an application programming interface (API) of a message generation application.

The communication device may initially display a user prompt to request generation of a pre-call message in one of a plurality of messaging applications. The display may include an indication of a plurality of messaging applications determined to be associated with an intended recipient based on a search of user contact information or determined from a database of contact information associated with a user organization. Aspects described herein may be used with any type of messaging application.

The communication device may receive user input data, based on display of determined application data, and may determine, based on user input data, a selected messaging application of the plurality of messaging applications and a format for generating message data based on the selected messaging application.

In step 330, the communication device may determine that the draft message has been closed or cancelled. In such a case, a user may be presented draft message on a display screen associated with the communication device. The user may be presented a message with editable text data, and will allow the user to option to dismiss or close the draft message. In step 335, based on such an action, the message generation application may determine when dismissal or closure action has occurred, and the message generation application may terminate a draft message generation process. Based on the termination of the draft message generation process, the process may return to an originating application that provided the indication of the initiation event for the communication session, to begin the communication session.

In step 340, after receiving feedback from the user of the draft message generation application, the application may proceed to authenticate the user to at least one device associated with an intended recipient of the communication session. The authentication may include the transmission of an authenticator, such as a public key, to an intended recipient. Such an authenticator, or other data stored by the draft message generation application, may be used for encryption of the message data determined based on the user feedback in step 325. In step 345, the communication session may be initiated. The initiation may be based on an input from a user. The message generation application may suggest an application for establishing the communication session based on data associated with the intended user. One or more of the foregoing steps may be accomplished with or by another computing device. For example, a machine learning model may be applied to user data locally on communication device or may be applied a database of organization data by one or more computing device(s) 201.

Figure 4:
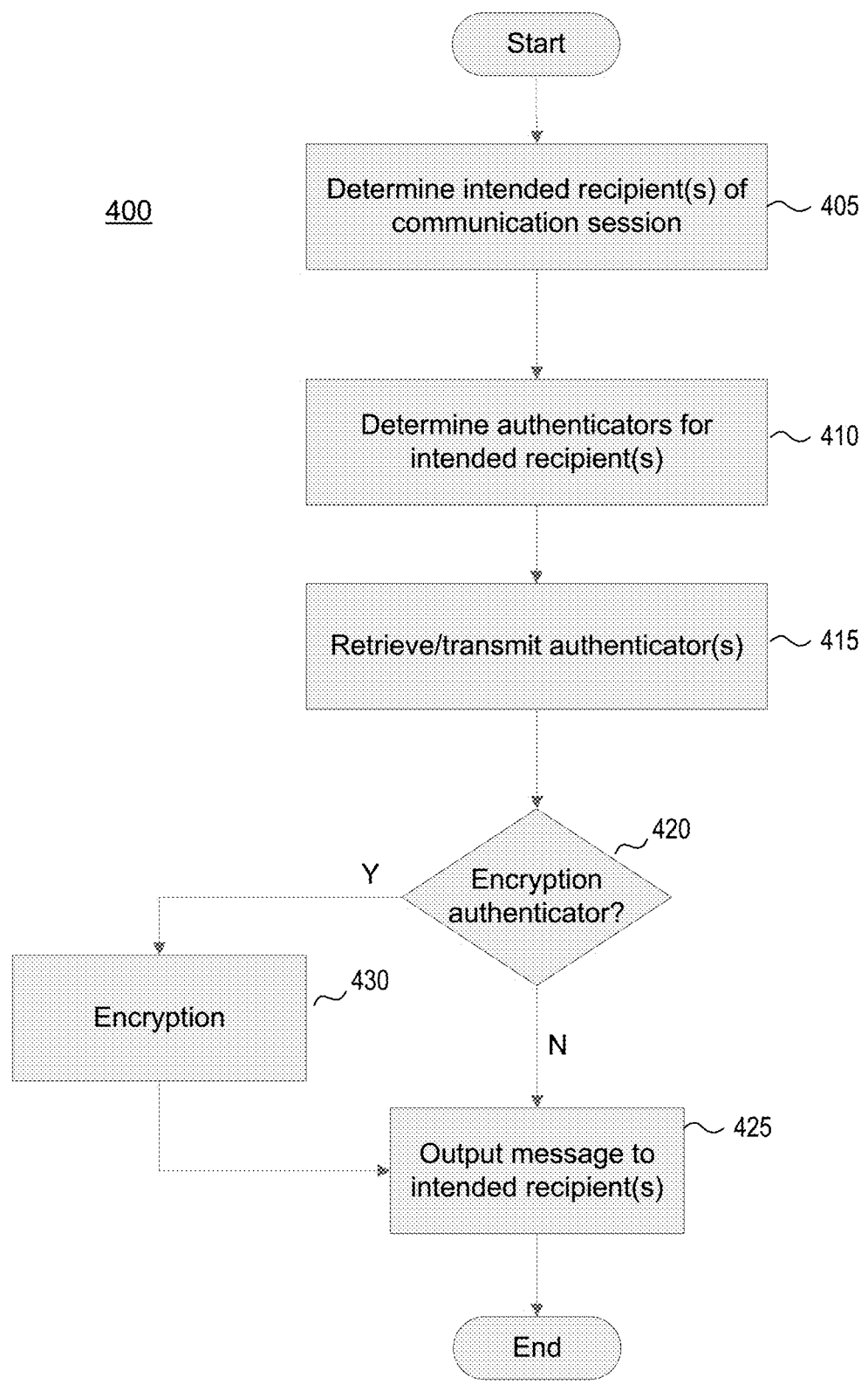
FIG. 4 depicts a flow chart for a method for determining authenticators for use with an introductory message in accordance with one or more illustrative aspects discussed herein.

FIG. 4 illustrates an example method 400 for method of authenticating a communication session to an intended recipient. An introductory message may include the transmission of an authenticator and may be encrypted, in accordance with one or more aspects described herein. The authenticator may be generated or retrieved, and the message may be encrypted, by a device such as a computing device 101, computing device 201, or a communication device 240, in accordance with one or more aspects described herein. The following discussion will refer to an exemplary communication device for implementing the method, though the use of a communication device such as a mobile phone is exemplary and not limiting.

In step 405, communication device may determine intended recipient(s) of a communication session and may determine intended recipient device(s) associated with the intended recipient(s). As with step 310, the intended recipient may be determined based on a phone number dialed, data obtained based on a link selected, data associated with a button pressed on a communication application, participants determined from a meeting invite, or the like. The intended recipient data may be compared with stored data, which may include a database associated with a plurality of users of an organization or a plurality of users of a messaging service.

In step 410, communication device may determine an authenticator for an intended recipient(s). The authenticator may be a key, which may be a public key or a private key, a digital signature, an electronic signature, or a certificate associated with a public key infrastructure. In step 415, communication device may retrieve an authenticator for the intended recipient(s), and may transmit an authentication message to the intended recipient(s). An authentication message may be a message sent prior the draft user introduction message, or may be integrated with the draft user introduction message. The authenticator may be specific to the user sending the authenticator or the intended recipient.

The authenticator may be received by the intended recipient(s), and the intended recipient(s) may respond with an acknowledgement or a responsive authenticator. The response from a device of the intended recipient may be based on user feedback or may be an automatic response of the intended recipient(s) device based on receipt of the authenticator. That is, each communication device may include an encryption negotiation module as part of a draft message generation program. The application may be installed on each endpoint of the communication session, and may transmit messages authenticating the other endpoint, may confirm receipt of an authenticator, may confirm a type of encryption to be applied, and a may test a received authenticator with a workspace storage that maintains a record of each identifier.

In step 420, communication device may determine if authenticator may be used an encryption authenticator, and may determine if the intended recipient(s) device(s) are configured for encryption. When no encryption is determined to be necessary or available, in step 425, the communication device may output the message after user input has indicated that the message is ready to send. In step 430, when the communication device determines that intended recipient is compatible with encryption, communication device may encrypt the message before the message is transmitted to the intended recipient(s) in step 425.

Like method 300, method 400 may be implemented by a suitable computing system, as described further herein. For example, method 400 may be implemented by any suitable computing environment by a computing device and/or combination of computing devices, such as computing devices 101, 105, 107, and 109 of FIG. 1 or computing devices 201, 240 or 250 of FIG. 2. The start of method 400 also may occur following step 305, step 310, step 315, or step 325 in FIG. 3.

Figure 5:
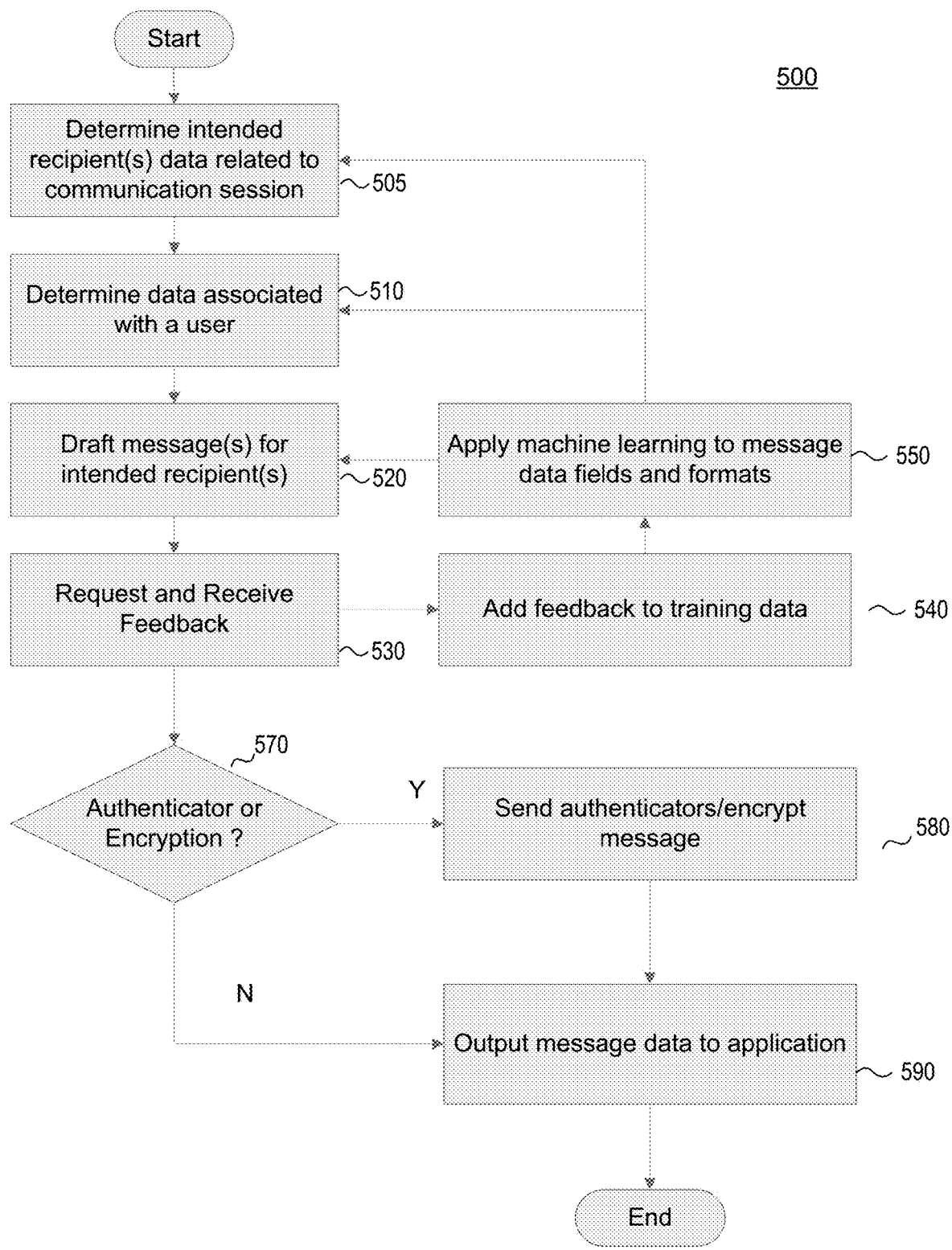
FIG. 5 depicts a flow chart for a method for determining message data in accordance with one or more aspects of the disclosure.

FIG. 5 illustrates an example method 500 for a method for determining message data for an introductory message to an intended recipient before beginning a communication session. In step 505, a message generation application on the communication device may determine intended recipient data. The intended recipient may be determined by applying a machine learning module to data associated with the communication session, which may include performing natural language processing (NLP) on data. For example, a message generation application may perform natural language processing on an email or calendar event to determine intended recipient data.

As discussed above with regards step 310, the intended recipient may be determined based on a phone number, data associated with a selected link, data associated with a communication application, participants determined from a meeting invite, or the like. The application may be associated with network application functions, which may include the determining whether the intended recipient data is associated with an account for the message generation application. Based on such a determination, the message generation application may also determine intended recipient preferences and communication applications associated with the intended recipient. The intended recipient data may be compared with stored network data, which may include a database of application users, preferences, and authorizations. The intended recipient data may be based on a search of contact data of the communication device, which may include application specific contact or addressing information associated with the intended recipient. The application specific contact information may be used to present a messaging application option selection to the user.

In step 510, the message generation application may determine data associated with a user. When the application is downloaded or installed, the user may be requested to enter personal information that may be used to generate message data and may be requested to grant permissions to access at least one program or storage locations that may include data that may be used to generate message data. For example, the user may be requested to grant permission to access to an email program, a calendar program, or to access databases of data stored locally or stored on a network storage device. The application may store personal information data identifying the user, including a preferred name associated with the user and a preferred title associated with the user. The preferences may include separate settings for personal messages and business messages. For example, the preferences may include a formal name setting used for business matters, and may include informal nickname used for family and friends.

In step 520, the message generation application may determine data fields and formatting to be used for the draft message data. The format may be determined based on user preferences and may be based on an application determined for the message. For example, based on an SMS message selection, the formatting may include a narrative format with multiple sentences or multiple messages, or based on a twitter message selection, the formatting may include limited data due to character limits of the message format. In step 530, the message generation application may request and receive feedback from user. The message data may be presented to the user in a display associated with a selected messaging application. The feedback may include a selection of a style of message, editing of draft message data presented to the user, and/or the addition of new information to the draft message.

In step 540, based on the feedback received from user, feedback data may be added to the training data set 129. The data may be stored in a database of fields that may be used to populate various messages. The fields may include name data, title data, organization data, and the like. The feedback data may be locally stored as user specific training data in the communication device, and may be stored in the network data storage 221 for training of data for an organization or the application in general. The storage of feedback data in the network data storage 221 may be based on a grant of permission by the user. The data to be added to the training set may include new data from other applications, to which the message generation application has been granted permission. For example, new email data, indicating new greeting or signature field data, may be added to the training set data, even when the new email data is not related to the intended recipient of the message being generated. The new data may include at least one of a relationship data, event data, organization data, user activity, recent communication data, or time and location data.

In step 550, the message generation application may apply machine learning to feedback data message and to data associated with the message data to be generated. The machine learning may include performing natural language processing (NLP) or other context matching ML to data associated with a message to be processes. By performing natural language processing on the data associated with the communication session, the message generation application may determine the message context information and message style preferences to be used in generating a next message, or to generate a new format of the current message data based on a user selection of a new messaging application or based on a user selection of a new style setting (e.g. changing style from informal to formal, which may include changing an informal nickname used for family and friends (such as "Dougie") to a formal name setting used for business matters (such as "Douglas")). The processing of the feedback data may be used to update user preferences and settings. The machine learning module may, in step 550, request new information from a user, such as a setting to be associated with an intended recipient or a request for a new permission based on a user selection. The machine learning module may use a machine learning algorithm to analyze each previously sent introduction message data, and may weight data from more recently sent messages to give the most recently sent messages a greater emphasis when determining user message preferences. The machine learning data may be provided as feedback to each of steps 505, 510, and 520, and the feedback process of step 530 may include the request for iterative feedback from the machine learning module in step 550 until a message data stabilization threshold has been reached. Once the machine learning module has reached stabilization, the machine learning module may provide the generated message data to the message generation process.

In step 570, after user feedback, the message generation application may determine whether to include an authenticator or an indicator of encryption usable with a draft message. In step 580, based on a determination that the user and/or intended recipient are associated with an authenticator, the authenticator may be added to the message data or provided to the message generation application to be transmitted to the intended recipient. In addition, based on a determination that the user and/or intended recipient are associated with an indicator of encryption usable with a draft message, the data determined for the draft message may be encrypted prior to being transmitted to the intended recipient. In step 590, the message data may be transmitted to the application generating the introductory message on communication device for output.

Method 500 may be implemented by a suitable computing system, as described further herein. For example, method 500 may be implemented by any suitable computing environment by a computing device and/or combination of computing devices, such as computing devices 101, 105, 107, and 109 of FIG. 1 or computing devices 201, 240 or 250 of FIG. 2. Method 500 may be implemented in suitable program instructions, such as in machine learning software 127, and may operate on a suitable training set, such as training set data 129.

Some aspects described herein may provide benefits for generating introduction messages, such as: more accurately and quickly identifying message applications and message data associated with an intended recipient and in keeping with user preferences, identifying security options available for messaging and communications sessions, and allowing for an intended recipient to recognize sources of incoming communications with increased confidence.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Any and all features in the following claims may be combined or rearranged in any way possible.

What is claimed is:

1. A method comprising:

receiving, from a communication service application and by a computing device, data indicating initiation of a communication session;

determining, based on the data indicating initiation of the communication session, an intended recipient of the communication session;

determining data identifying a user, wherein the data identifying the user comprises a preferred name associated with the user;

determining at least one messaging application, on the computing device, based on addressing information associated with the intended recipient;

generating, based on the data indicating initiation of the communication session and the intended recipient of the communication session and for the determined at least one messaging application, a draft message to be transmitted to the intended recipient indicating the communication session is authentic, wherein the draft message comprises the preferred name associated with the user;

causing, by the computing device, display of a generated draft message;

receiving, by the computing device and based on the display of the generated draft message, user input regarding message data to be transmitted to the intended recipient;

authenticating, by the computing device and based on authentication information associated with the user, an identity of the user;

sending, by the computing device and to an intended recipient device, authentication information associated with the user;

receiving, by the computing device and from the intended recipient device, confirmation of the authentication information;

encrypting, by the computing device, the message data;

sending, by the computing device and prior to initiating the communication session, based on the user input regarding message data, and after confirmation of the authentication information, the encrypted message data to the intended recipient device; and initiating, by the computing device and after sending the message data to the intended recipient, the communication session with the intended recipient.

2. The method of claim 1, wherein the communication session is one of a phone call, a voice over IP communication session, or a video communication session.

3. The method of claim 1, wherein encrypting, by the computing device, the message data comprises encrypting, by the computing device and based on a public key, both a user identifier and the message data with the public key.

4. The method of claim 1, wherein the authentication information associated with the user is a public key.

5. The method of claim 1, wherein the determining the data identifying the user comprises determining a preferred title associated with the user.

6. The method of claim 1, wherein the generating the draft message to be transmitted to the intended recipient comprises:

determining, based on a machine learning model, message context information, wherein the machine learning model analyzes data messages previously sent by the computing device to determine user message preferences.

7. The method of claim 6, the method further comprising:

requesting permission to access at least one of a plurality of applications;

determining, by the computing device, data associated with the communication session, wherein the data associated with the communication session is determined from at least one of meeting request data, calendar data, contact data, or recent document data; and performing natural language processing on the data associated with the communication session to determine the message context information.

8. The method of claim 1, wherein the data indicating initiation of the communication session comprises an event reminder notification, wherein event data associated with the event reminder notification comprises at least one of a phone number, a conferencing service identifier, or a video service identifier.

9. The method of claim 1, wherein the data indicating initiation of the communication session comprises at least one dialing event, the method further comprising:

causing, by the computing device, display of a user prompt to request generation of a pre-call message in one of a plurality of messaging applications; and receiving, by the computing device and based on the display of the user prompt to request generation of a pre-communication session message, data indicating a selected messaging application of the plurality of messaging applications, wherein the generating the draft message to be transmitted to the intended recipient comprises generating the draft message for the selected messaging application.

10. An apparatus comprising:

a display screen;

at least one communications interface;

one or more processors; and memory comprising instructions that, when executed by the one or more processors, cause the one or more processors to:

receive, from a communication service application, data indicating initiation of a communication session;

determine, based on the data indicating initiation of the communication session, an intended recipient of the communication session;

determine data identifying a user, wherein the data identifying the user comprises a preferred name associated with the user;

determine at least one messaging application based on addressing information associated with the intended recipient;

determine, by a machine learning model and based on the data indicating initiation of the communication session and the determined intended recipient of the communication session, message context information, wherein the machine learning model analyzes data messages previously sent to determine user message preferences;

generate, based on the message context information and for the determined at least one messaging application, a draft message to be transmitted to the intended recipient indicating the communication session is authentic, wherein the draft message comprises the preferred name associated with the user;

cause display of a generated draft message;

receive, based on the display of the generated draft message, user input regarding message data to be transmitted to the intended recipient;

authenticate, based on authentication information associated with the user, an identity of the user;

send, to an intended recipient device, authentication information associated with a user;

receive, from the intended recipient device, confirmation of the authentication information;

encrypt the message data;

send, prior to initiating the communication session, based on the user input regarding message data, and after confirmation of the authentication information, the encrypted message data to the intended recipient device; and initiate, after sending the message data to the intended recipient, the communication session with the intended recipient.

11. The apparatus of claim 10, wherein the communication session is one of a phone call, a voice over IP communication session, or a video communication session.

12. The apparatus of claim 10, wherein encrypting the message data comprises encrypting, based on a public key, both a user identifier and the message data with the public key.

13. The apparatus of claim 10, wherein the data indicating initiation of the communication session comprises an event reminder notification, wherein event data associated with the event reminder notification comprises at least one of a phone number, a conferencing service identifier, or a video service identifier.

14. The apparatus of claim 10, wherein the instructions further cause the one or more processors to:

request permission to access at least one of a plurality of applications;

determine data associated with the communication session, wherein the data associated with the communication session is determined from at least one of meeting request data, calendar data, contact data, or recent document data; and perform natural language processing on the data associated with the communication session to determine the message context information.

15. One or more non-transitory computer-readable media comprising instructions that, when executed by a computing system, cause the computing system to:
receive, from a communication service application, data indicating initiation of a communication session;
determine, based on the data indicating initiation of the communication session, an intended recipient of the communication session;
determine a messaging application associated with the intended recipient;
determining a preferred user name associated with the user and a preferred user identifier associated with the user;
generate, based on the data indicating initiation of the communication session and the intended recipient of the communication session, and for the determined messaging application, a draft message to be transmitted to the intended recipient via the determined messaging application indicating the communication session is authentic, wherein the draft message includes the preferred user name and the preferred user identifier;
cause display of a generated draft message;
receive, based on the display of the generated draft message, user input regarding message data to be transmitted to the intended recipient;
authenticate, based on authentication information associated with a user, an identity of the user;
send, to an intended recipient device, authentication information associated with a user;
receive, from the intended recipient device, confirmation of the authentication information;
encrypt, based on a public key, both a user identifier and the message data with the public key;
send, prior to initiating the communication session, based on the user input regarding message data, and after confirmation of the authentication information, the encrypted message data to the intended recipient device; and
initiate, after sending the message data to the intended recipient, the communication session with the intended recipient.

16. The one or more non-transitory computer-readable media of claim 15, wherein the communication session is one of a phone call, a voice over IP communication session, or a video communication session.

17. The one or more non-transitory computer-readable media of claim 15, wherein the instructions further cause the computing system to:
request permission to access at least one of a plurality of applications;
determine data associated with the communication session, wherein the data associated with the communication session is determined from at least one of meeting request data, calendar data, contact data, or recent document data; and
perform natural language processing on the data associated with the communication session to determine data for the draft message.

18. The one or more non-transitory computer-readable media of claim 15, wherein the instructions further cause the computing system to:
receive, based on display of a user prompt to request generation of a pre-communication session message, data indicating a selected messaging application of the plurality of messaging applications,
wherein the draft message is generated for the selected messaging application.

19. The one or more non-transitory computer-readable media of claim 15, wherein the instructions further cause the computing system to:
determine, based on a machine learning model, message context information, wherein the machine learning model analyzes previously sent data messages to determine user message preferences.

20. The one or more non-transitory computer-readable media of claim 19, wherein the instructions further cause the computing system to:
request permission to access at least one of a plurality of applications;
determine data associated with the communication session, wherein the data associated with the communication session is determined from at least one of meeting request data, calendar data, contact data, or recent document data; and
perform natural language processing on the data associated with the communication session to determine the message context information.

* * * * *